US009134951B2

(12) United States Patent
Katou et al.

(10) Patent No.: US 9,134,951 B2
(45) Date of Patent: Sep. 15, 2015

(54) CONTENTS RECEPTION SYSTEM, ATTACHMENT, AND TERMINAL DEVICE

(75) Inventors: Yumi Katou, Tokyo (JP); Seiji Sugahara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/361,672

(22) PCT Filed: Jul. 23, 2012

(86) PCT No.: PCT/JP2012/004658
§ 371 (c)(1),
(2), (4) Date: May 29, 2014

(87) PCT Pub. No.: WO2013/080402
PCT Pub. Date: Jun. 6, 2013

(65) Prior Publication Data
US 2014/0337545 A1    Nov. 13, 2014

(30) Foreign Application Priority Data
Nov. 30, 2011    (JP) .................................. 2011-262146

(51) Int. Cl.
*G06F 3/147* (2006.01)
*G06F 17/30* (2006.01)
*H04M 1/725* (2006.01)

(52) U.S. Cl.
CPC .......... *G06F 3/147* (2013.01); *G06F 17/30017* (2013.01); *H04M 1/72575* (2013.01); *H04M 1/72558* (2013.01)

(58) Field of Classification Search
None
See application file for complete search history.

(56) References Cited

U.S. PATENT DOCUMENTS

| 7,184,807    | B2  | 2/2007  | Shimamura |
| 2004/0097277 | A1  | 5/2004  | Shimamura |
| 2005/0108462 | A1* | 5/2005  | Choi et al. ........................ 711/5 |
| 2007/0149177 | A1  | 6/2007  | Uchida    |
| 2007/0235519 | A1  | 10/2007 | Jang et al. |
| 2009/0172759 | A1  | 7/2009  | Jung      |

FOREIGN PATENT DOCUMENTS

| EP | 1843272 A2    | 10/2007 |
| EP |   1420570 B1  | 7/2009  |
| JP | 2004-153443 A | 5/2004  |

(Continued)

OTHER PUBLICATIONS

International Search Report Issued by the Japan Patent Office for International Application No. PCT/JP2012/004658 mailed Aug. 28, 2012 (1 pg).

*Primary Examiner* — Idriss N Alrobaye
*Assistant Examiner* — Dayton Lewis-Taylor
(74) *Attorney, Agent, or Firm* — Wilmer Cutler Pickering Hale and Dorr LLP

(57) ABSTRACT

In a terminal device, contents data from an attachment mounted on the device is received by a transmission/reception section and replayed by a first playback section. A detection section detects the mounting or removing of the attachment during the playback of the contents data. As an output destination for the contents data, a selection section selects the first playback section when the attachment has been mounted, or selects a first storage section when the attachment has been removed. In the attachment, the contents data is outputted to one of the first storage section and the first playback section based on the selection result of the terminal device. Accordingly, the usage mode of contents data can be readily changed with the mounting or removing of an attachment as a trigger.

6 Claims, 13 Drawing Sheets

(56) References Cited

FOREIGN PATENT DOCUMENTS

| JP | 2004-172654 A | 6/2004 |
|---|---|---|
| JP | 2005-204039 A | 7/2005 |
| JP | 2007-282241 A | 10/2007 |
| JP | 2009-159276 A | 7/2009 |
| JP | 2009-163699 A | 7/2009 |
| JP | 2009-200650 A | 9/2009 |
| JP | 2010-199743 A | 9/2010 |

* cited by examiner

FIG. 1
(a)
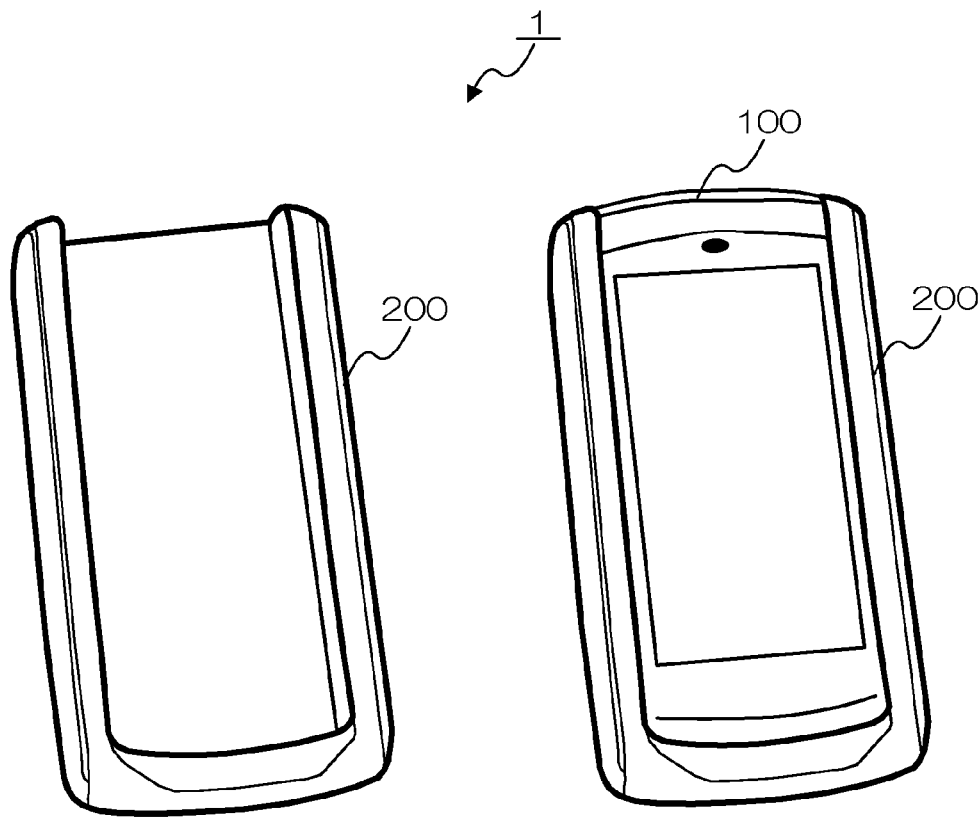
(b)
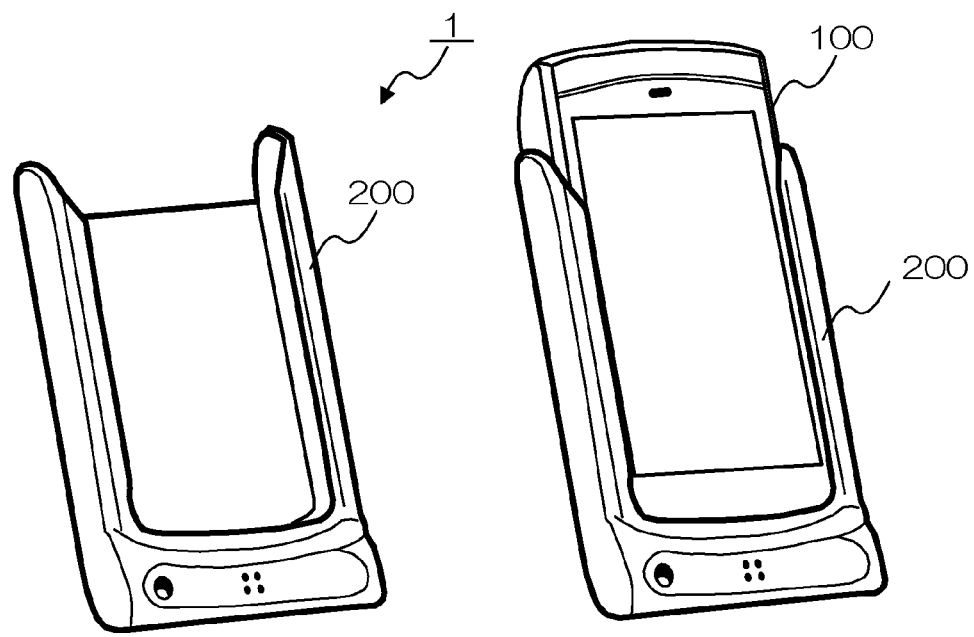

CONTENTS RECEPTION SYSTEM, ATTACHMENT, AND TERMINAL DEVICE

CROSS-REFERENCE TO RELATED APPLICATIONS

The present application is a national stage application of International Application No. PCT/JP2012/004658 entitled "Contents Reception System, Attachment, and Terminal Device," filed on Jul. 23, 2012, which claims the benefit of priority from Japanese Patent Application No. JP2011-262146, filed on Nov. 30, 2011, the disclosures of which are incorporated herein in their entirety by reference thereto.

TECHNICAL FIELD

The present invention relates to a contents reception system in which an attachment is mounted on a terminal device so as to receive contents data, the attachment, and the terminal device.

BACKGROUND ART

In recent years, portable terminals have been disclosed in which a detachable panel member or a multifunctional dongle is attached to the main body of the portable terminal so that additional functions corresponding to the panel member and the like are added.

For example. Patent Documents 1 and 2 disclose a technology in which a portable terminal that is used with a panel member being attached thereto is operated in accordance with information stored in the attached panel member. As a result of this technology, by the panel member being replaced, the operations can be changed in accordance with uses or owners.

Also, in Patent Document 3, a technology has been disclosed in which back panels are replaced in accordance with additional functions such as a camera function, a light emitting function, and a sound function.

Also, in Patent Document 4, a multifunctional dongle structured to be detachable from a portable terminal device has been disclosed, whereby functions such as a mobile financial transaction service, battery charging for the terminal device, and an FM transmitter can be selectively used.

Furthermore, in Patent Document 5, a portable terminal has been disclosed where a module embedded with an Internet communication module and a digital broadcasting reception module is connected to the portable terminal by means of USB (Universal Serial Bus), thereby receiving the digital broadcasting.

PRIOR ART DOCUMENTS

Parent Documents

Patent Document 1: JP 2009-159276
Patent Document 2: JP 2005-204039
Patent Document 3: JP 2004-172654
Patent Document 4: JP 2007-282241
Patent Document 5: JP 2009-163699

SUMMARY OF INVENTION

Problem to be Solved by the Invention

Incidentally, in a case where an attachment is mounted on a terminal device and contents data such as digital broadcasting is received, various cases are conceivable in terms of the usage mode (mode of viewing) of the contents data, inclusive of the output destination, playback and recording of images (recording of sound) of the contents data.

However, in the technologies of the above-described Patent Documents 1 to 5, there is a problem in that operations for the output destination, the playback and the recording of images of the contents data need to be set on each occasion corresponding to a variety of modes of use, which is troublesome.

Accordingly, an object of the present invention is to provide a contents reception system, an attachment, and a terminal device which are user-friendly.

Means for Solving the Problem

A contents reception system of the present invention, which includes a terminal device and an attachment detachably mounted on the terminal device, is characterized in that the attachment includes an acquisition section for acquiring contents data, a transmission section for transmitting the contents data acquired by the acquisition section to the terminal device, and a first storage section for storing the contents data, and the terminal device includes a reception section for receiving the contents data transmitted by the transmission section means, a detection section for detecting mounting or removing of the attachment, a first playback section for replaying the contents data, and a selection section for selecting at least one of the first storage section or the first playback section as an output destination for the contents data received by the reception section means based on a result of detection of the mounting or the removing of the attachment by the detection section means, wherein the attachment outputs the contents data acquired by the acquisition section to at least one of the first storage section or the first playback section based on a result of selection by the selection section of the terminal device.

An attachment of the present invention, which is detachably mounted on a terminal device, includes an acquisition section for acquiring contents data, a storage section for storing the contents data, and an output section for outputting the contents data acquired by the acquisition section to at least one of the storage section or the terminal device based on an output destination instruction for the contents data, which is selected based on a detection result of mounting or removing of the attachment to and from the terminal device.

A terminal device of the present invention, on which an attachment is detachably mounted, includes a reception section for receiving contents data transmitted from the attachment, a detection section for detecting mounting or removing of the attachment, a playback section for replaying the contents data received by the reception section, and a selection section for selecting at least one of the attachment or the playback section as an output destination for the contents data based on a result of detection of the mounting or the removing of the attachment by the detection section means, and indicating the output destination selected for the contents data to the attachment.

Effect of the Invention

According to the aspect of the present invention, the usage mode of contents data can be readily changed with the mounting or removing of an attachment as a trigger, without bothering users.

BRIEF DESCRIPTION OF DRAWINGS

FIG. 1 is a perspective diagram illustrating the outer structure of a contents reception system 1 according to a first embodiment of the present invention.

DESCRIPTION OF EMBODIMENTS

Figure 2:
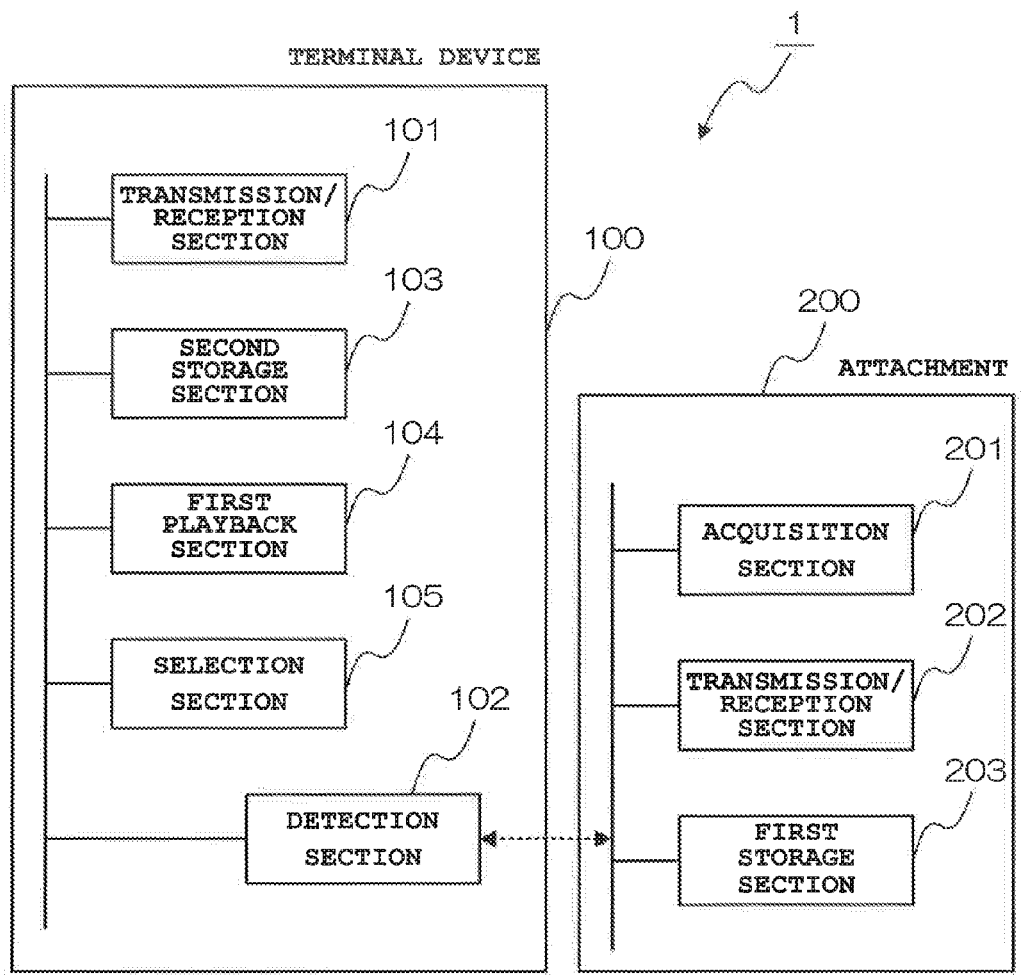
FIG. 2 is a block diagram illustrating the structure of a terminal device 100 and an attachment 200 constituting the contents reception system 1 of the first embodiment.

Hereinafter, the embodiments of the present invention will be described referring to the drawings.

A. First Embodiment

FIGS. 1(a) and (b) are perspective diagrams illustrating the outer structure of a contents reception system 1 according to a first embodiment of the present invention. In FIGS. 1(a) and (b), the contents reception system 1 includes a terminal device 100 and an attachment 200 mounted on the terminal device 100. The attachment 200 is detachably attached in the terminal device 100. In FIGS. 1(a) and (b), the attachment 200 (left side) and the terminal device 100 on which the attachment 200 is mounted are illustrated. Regarding the attachment 200, as described in FIGS. 1(a) and (b), a variety of shapes, colors, materials, and the like are adopted.

FIG. 2 is a block diagram illustrating the structure of the terminal device 100 and the attachment 200 constituting the contents reception system 1 of the first embodiment. The attachment 200 includes an acquisition section 201, a transmission/reception section 202, and a first storage section 203. The acquisition section 201 acquires contents data via the Internet (not illustrated) and the like. As the acquisition section means 201, tuners and antennas compatible with the terrestrial digital broadcasting or multimedia broadcasting are included. It is conceivable that the contents data received is, for example, the terrestrial digital broadcasting or multimedia broadcasting, but not limited thereto.

The transmission/reception section 202 transmits contents data acquired from the acquisition section 201 to the terminal device 100 and receives an output destination instruction (signal) indicating an output destination for the contents data from the terminal device 100. The communication (transmission and reception) between the attachment 200 and the terminal device 100 is performed by, for example, wireless LAN (Wi-Fi), Bluetooth (registered trademark), non-contact IC, and the like. The first storage section 203 stores contents data. The attachment 200 outputs contents data to the terminal device 100 or the first storage section thereof in accordance with an output destination instruction from terminal device 100. Note that the attachment 200 has a built-in battery not shown and can be independently operated even when it is not mounted on the terminal device 100.

The terminal device 100 includes a transmission/reception section 101, a detection section 102, a second storage section 103, a first playback section 104, and a selection section 105. The transmission/reception section 101 receives contents data transmitted from the transmission/reception section 202 of the attachment 200 and transmits to the attachment 200 an output destination instruction (signal) indicating an output destination for the contents data which has been selected based on a result of detection of the mounting or removing of the attachment 200 by the detection section 102.

The detection section 102 detects the mounting or removing of the attachment 200. Specifically, the mounting of the attachment 200 is detected by means of a mechanical contact with the detection section (not illustrated) of the attachment 200 or by linkage with electromagnetic induction. Furthermore, conduction between the detection section 102 of the terminal device 100 and the detection section (not illustrated) of the attachment 200 may be detected, and the press-down of a switch (not illustrated) provided in the terminal device 100 caused by the mounting of the attachment 200 may be detected. Also, the detection by a magnetic sensor, an optical sensor, or the like is conceivable. In a case where the detection section 102 is constituted by the Bluetooth (registered trademark), the non-contact IC, and the like, the detection section 102 may serve as both the transmission/reception section and the detection section interposed between the attachment 200 and the terminal device 100.

The second storage section 103 stores contents data. The first playback section 104 replays contents data with the attachment 200 being mounted on the terminal device 100 and the contents data being acquired by the acquisition section 201. Also, the first playback section 104 can replay contents data stored in the second storage section 103. In this case, the attachment 200 needs not be mounted on the terminal device 100. As the first playback section 104, a general decoder for performing music playback, moving image playback, and the like can be used. The selection section 105 selects at least one of the first storage section 203, the second storage section 103, and the first playback section 104 as an output destination for contents data received by the reception section 101 in accordance with the detection of the mounting or removing of the attachment 200 by the detection section 102.

Figure 3:
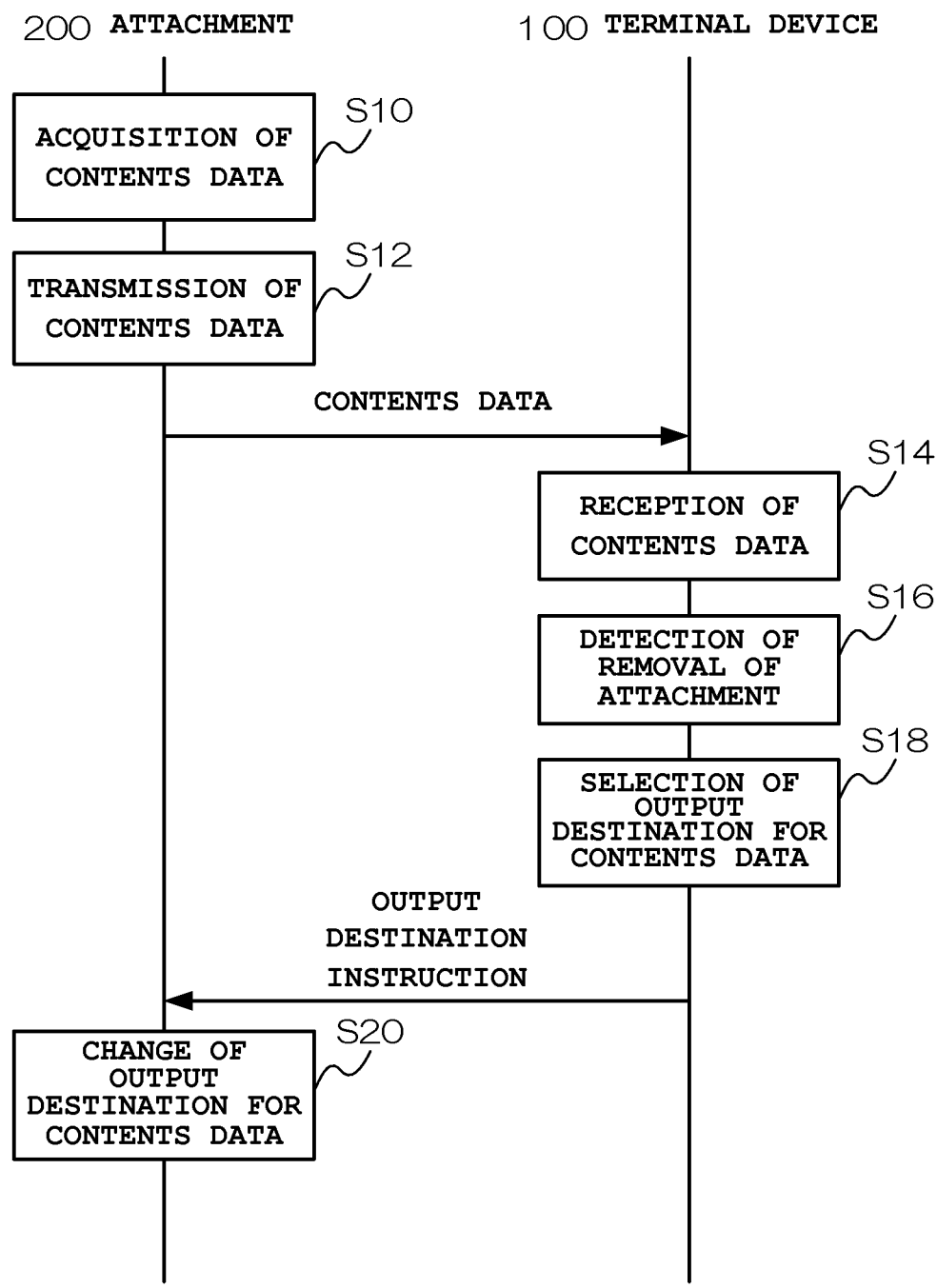
FIG. 3 is a sequence diagram to describe the operation of the terminal device 100 and the attachment 200 constituting the contents reception system 1 of the first embodiment.

FIG. 3 is a sequence diagram to describe the operation of the terminal device 100 and the attachment 200 constituting the contents reception system 1 of the first embodiment. First, contents data is acquired by the acquisition section 201 of the attachment 200 (Step S10). Subsequently, the contents data is transmitted from the acquisition section 201 to the terminal device 100 via the transmission/reception section 202 (Step S12).

In the terminal device 100, the contents data transmitted from the transmission/reception section 202 of the attachment 200 is received by the transmission/reception section 101 (Step S14). Subsequently, in the terminal device 100, the mounting or removing of the attachment 200 is detected by the detection section 102 (Step S16), and at least one of the first storage section 203, the second storage section 103, and the first playback section 104 is selected by the selection section 105 in accordance with the detection result, as an output destination for the contents data received by the transmission/reception section 101 (Step S18). Note that this output destination for the contents data may be one of the first storage section 203 or the first playback section 104, that is, one of the attachment 200 or the terminal device 100. Subsequently, an output destination instruction (signal) indicating the selected output destination is transmitted to the attachment 200 via the transmission/reception section 101.

In the attachment 200, the output destination instruction is received by the transmission/reception section 202, and the contents data is outputted to the output destination indicated by the output destination instruction, that is, at least one of the first storage section 203, the second storage section 103, and the first playback section 104 (Step S20). As described above, when one of the first storage section 203 and the first playback section 104 is indicated as an output destination for contents data, the contents data is outputted to one of the first storage section 203 or the first playback section 104.

As a result, the playback of contents data received in the terminal device 100, the storage of contents data in the attachment 200, or the storage of contents data in the terminal device 100 can be controlled in accordance with the detection of the mounting or removing of the attachment 200 to/from the terminal device 100. That is, when the first storage section 203 is selected as an output destination for contents data, the contents data is stored in the first storage section 203 of the attachment 200. Also, when the second storage section 103 is selected as an output destination for contents data, the contents data is stored in the second storage section 103 of the terminal device 100. Then, when the first playback section 104 is selected as an output destination for the contents data, the contents data is replayed by the first playback section 104 of the terminal device 100.

Note that the output destination for contents data may be set in advance at the time of shipment from the factory or may be set by users. In the latter case, setting appropriate to each user's usage mode can be achieved.

Next, a specific example of the operation of selecting an output destination for contents data in accordance with the detection of the mounting or removing of the attachment 200 in the present embodiment will be described.

A-1. Example of First Operation

Figure 4:
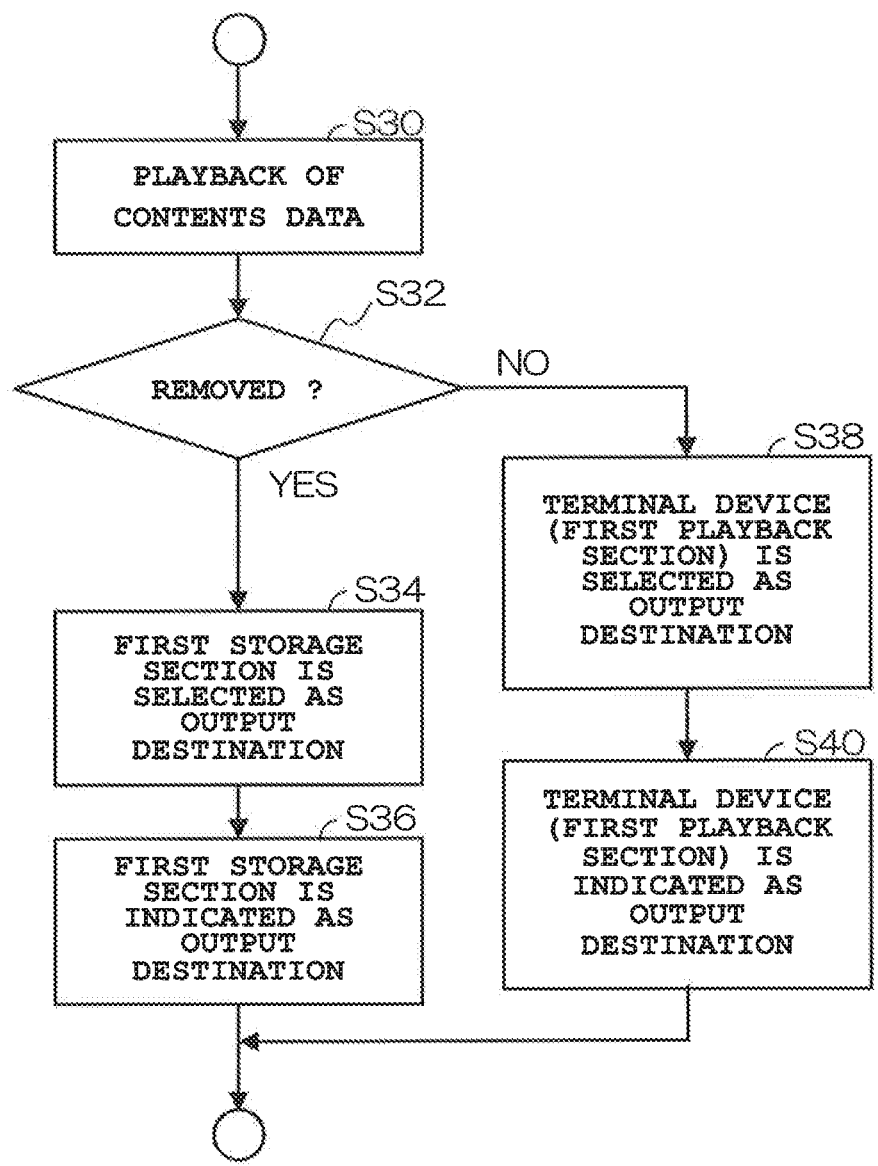
FIG. 4 is a flowchart to describe an example of the first operation of the terminal device 100 of the first embodiment.
Figure 5:
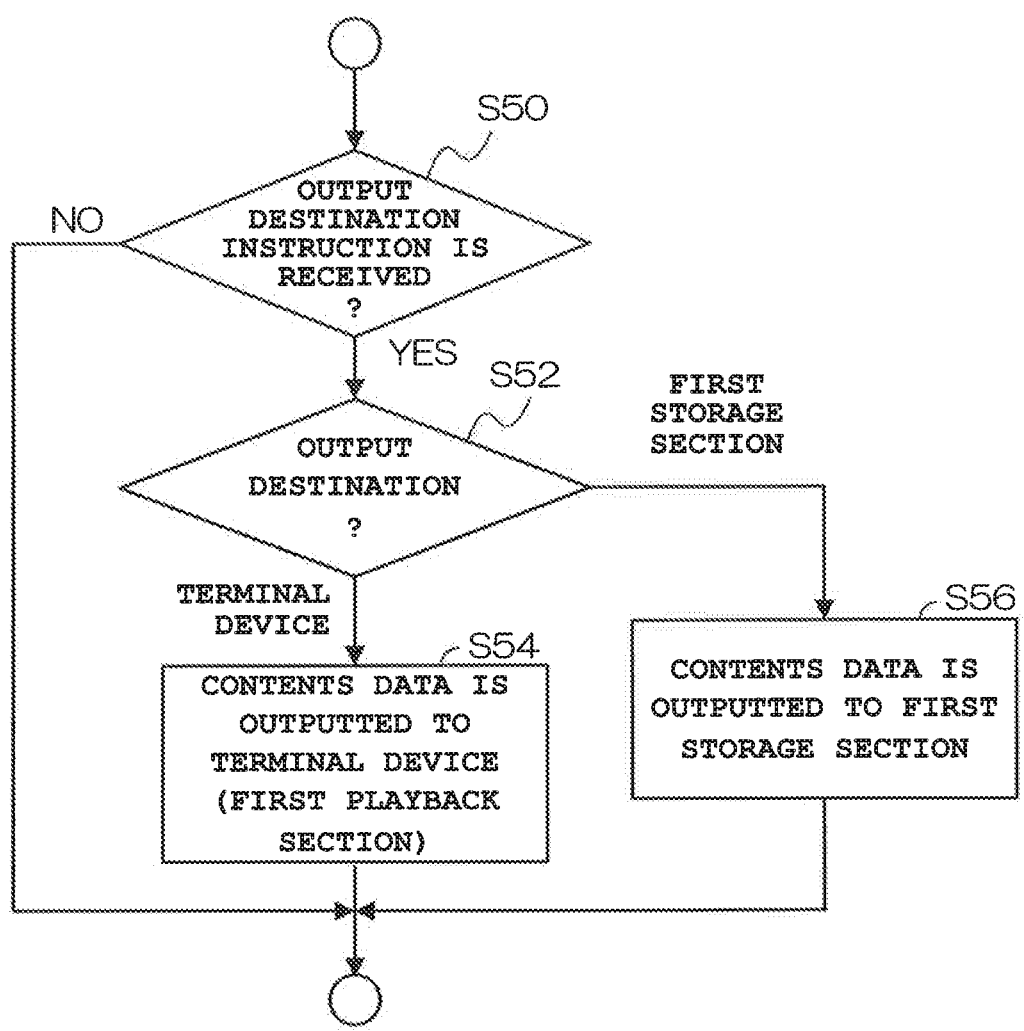
FIG. 5 is a flowchart to describe an example of the first operation of the attachment 200 of the first embodiment.

First, an operation example when the storage (recording) of contents data is started will be described. FIG. 4 is a flowchart to describe an example of the first operation of the terminal device 100 in the first embodiment. Also, FIG. 5 is a flowchart to describe an example of the first operation of the attachment 200 in the first embodiment. Here, the attachment 200 has been mounted on the terminal device 100, and contents data such as streaming data (for example, multimedia broadcasting) received by the acquisition section 201 of the attachment 200 has been received and replayed by the first playback section 104.

When the terminal device 100 is replaying contents data such as streaming data (for example, multimedia broadcasting) (Step S30), it is judged whether or not the presence or absence of the removal of the attachment 200 has been detected by the detection section 102 (Step S32). Then, when the removal has been detected (Step S32, YES), the first storage section 203 is selected by the selection section 105 as an output destination for the contents data (Step S34), and indicated to the attachment 200 as the output destination (Step S36).

In contrast, when the removal is not detected (Step S32, NO), the terminal device 100 (the first playback section 104) is selected by the selection section 105 as an output destination for the contents data (Step S38), and indicated to the attachment 200 as the output destination (Step S40). Note that, when the attachment 200 has not been removed, the output destination is not changed. Therefore, Steps S38 and S40 may be omitted.

In the attachment 200, when the received contents data is being outputted to the terminal device 100 (the first playback section 104), it is judged whether or not an output destination instruction has been received by the transmission/reception section 202 from the terminal device 100 (Step S50). Then, when an output destination instruction has not been received (Step S50, NO), the received contents data is continuously outputted to the terminal device 100 (the first playback section 104).

In contrast, when an output destination instruction is received from the terminal device 100 (Step S50, YES), it is judged whether an output destination indicated by the output destination instruction is the terminal device 100 or the first storage section 203 (Step S52). Then, when the output destination indicated by the output destination instruction is the terminal device 100 ("terminal device" at Step S52), the contents data is outputted to the terminal device 100 (the first playback section 104) (Step S54). As a result, in the state where the attachment 200 has been mounted, the first playback section 104 of the terminal device 100 continues the content playback.

In contrast, when the output destination indicated by the output destination instruction is the first storage section 203 ("first storage section" at Step S52), the contents data is outputted to the first storage section 203 (Step S56). As a result, in the state where the attachment 200 has been removed, the first storage section 203 of the attachment 200 stores (records) the content.

Note that, in a case where the contents data being replayed is stored (recorded) with the attachment 200 being attached, the contents data is stored in one of the second storage section 103 of the terminal device 100 and the first storage section 203 of the attachment 200. Even when the contents data is music or the like, the same operation can be applied.

A-2. Second Operation

Next, a case where contents data is retroactively stored (recorded) will be described. In the case where the storage (recording) of contents data is started in accordance with the removal of the attachment 200, recording data to be actually stored includes data for a few seconds before the attachment 200 is removed. Specifically, contents data for a predetermined period of time before the removal is stored in the first storage section 203 of the attachment 200 as a cache. As a result, the contents data can be stored (recorded) in the first storage section 203 of the attachment 200 without excluding contents data received from when the attachment 200 is removed until when the recording operation is started.

According to the above-described first embodiment, the usage mode of contents data can be readily changed with the mounting or removing of the attachment 200 as a trigger, without bothering the user.

Also, according to the above-described first embodiment, when the attachment 200 is removed during the playback of contents data such as streaming data, the real-time playback of the contents data is no longer possible by the terminal device 100. However, even after the removal of the attachment 200, the contents data can be received by the attachment 200 and stored (recorded) by the storage section of the attachment 200. Accordingly, even when the attachment 200 is removed and the playback of contents data is no longer possible, the contents data is automatically stored (recorded), which prevents the contents data from being missed.

B. Second Embodiment

Figure 6:
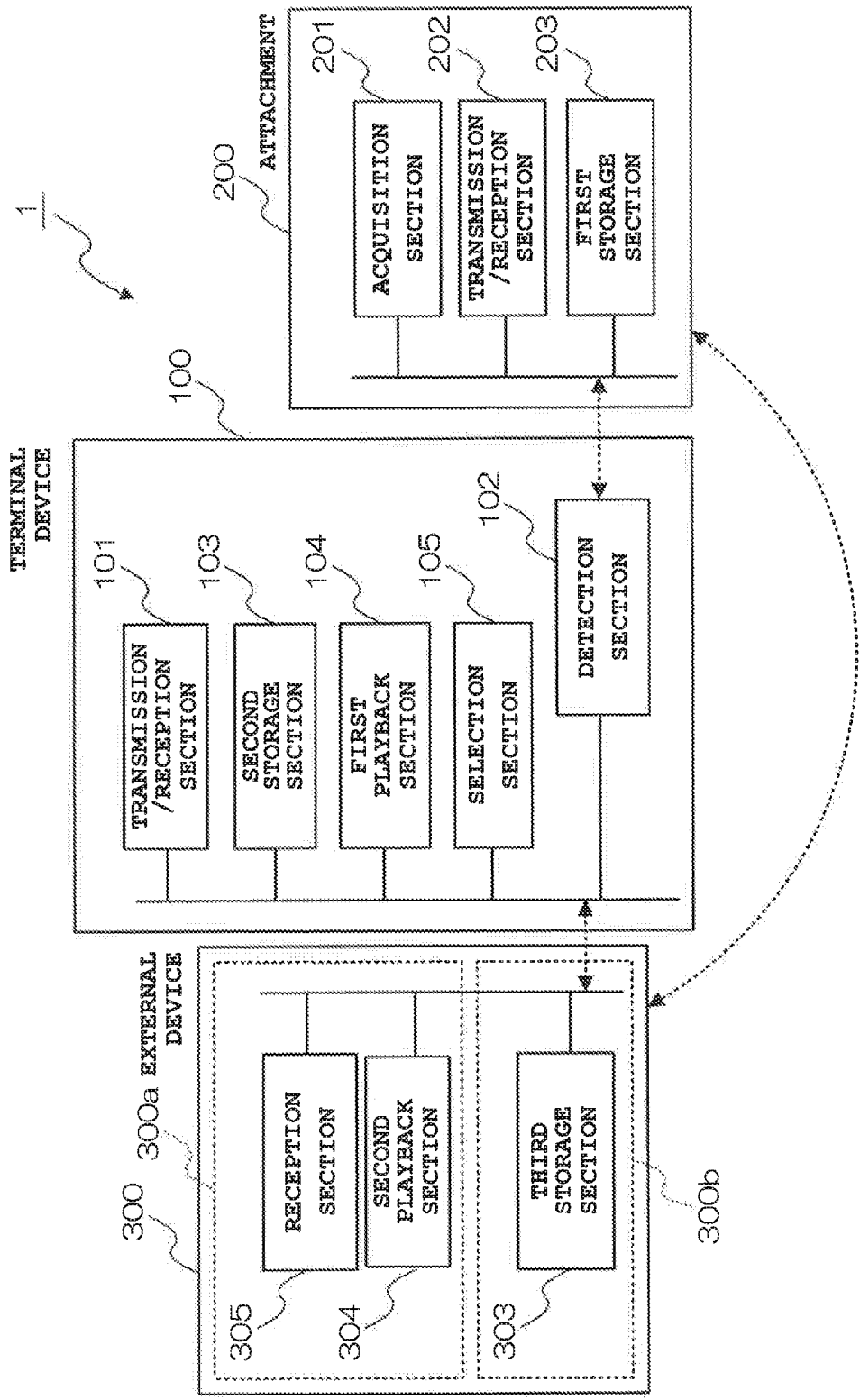
FIG. 6 is a block diagram illustrating the structure of the terminal device 100, the attachment 200, and an external device 300 constituting the contents reception system 1 according to a second embodiment.

Next, the second embodiment of the present invention will be described. FIG. 6 is a block diagram illustrating the structure of the terminal device 100, the attachment 200, and an external device 300 constituting the contents reception system 1 according to the second embodiment. In the diagram, parts corresponding to those of FIG. 2 are given the same reference numerals, and descriptions thereof are omitted. In FIG. 6, the external device 300 (for example, speakers, liquid crystal televisions, and recorders) is provided in the contents reception system 1. The external device 300 includes a third storage section 303, a second playback section 304, and a reception section 305.

The communication (transmission and reception) between the external device 300 and the terminal device 100, or the communication (transmission and reception) between the external device 300 and the attachment 200 is performed by, for example, wire, wireless LAN (Wi-Fi), Bluetooth (registered trademark), and non-contact IC by the transmission/reception section 101 of the terminal device 100, the transmission/reception section 202 of the attachment 200, and the reception section 305 of the external device 300. Note that the terminal device 100, the attachment 200, and the external device 300 can be identified by each other based on known technologies, by which contents data can be transmitted or received between specific devices.

Figure 7:
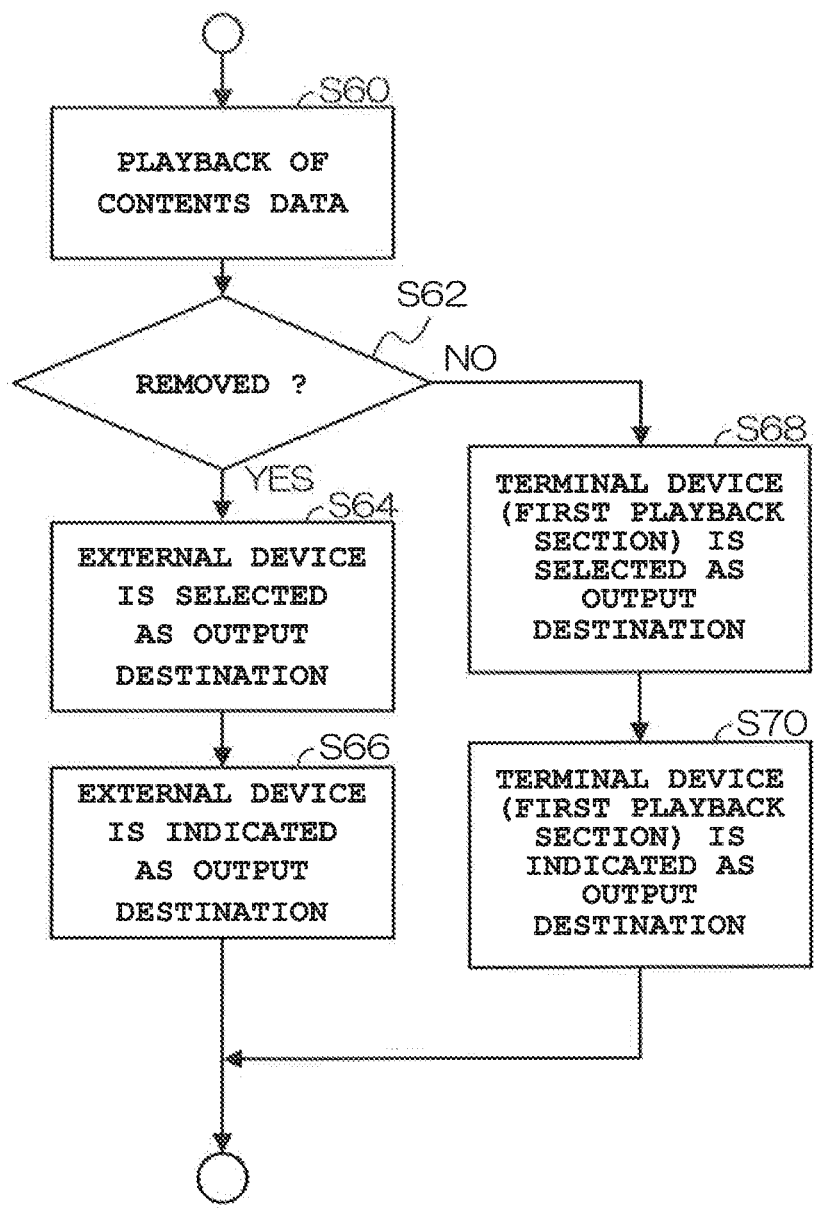
FIG. 7 is a flowchart to describe the operation of the terminal device 100 of the second embodiment.
Figure 8:
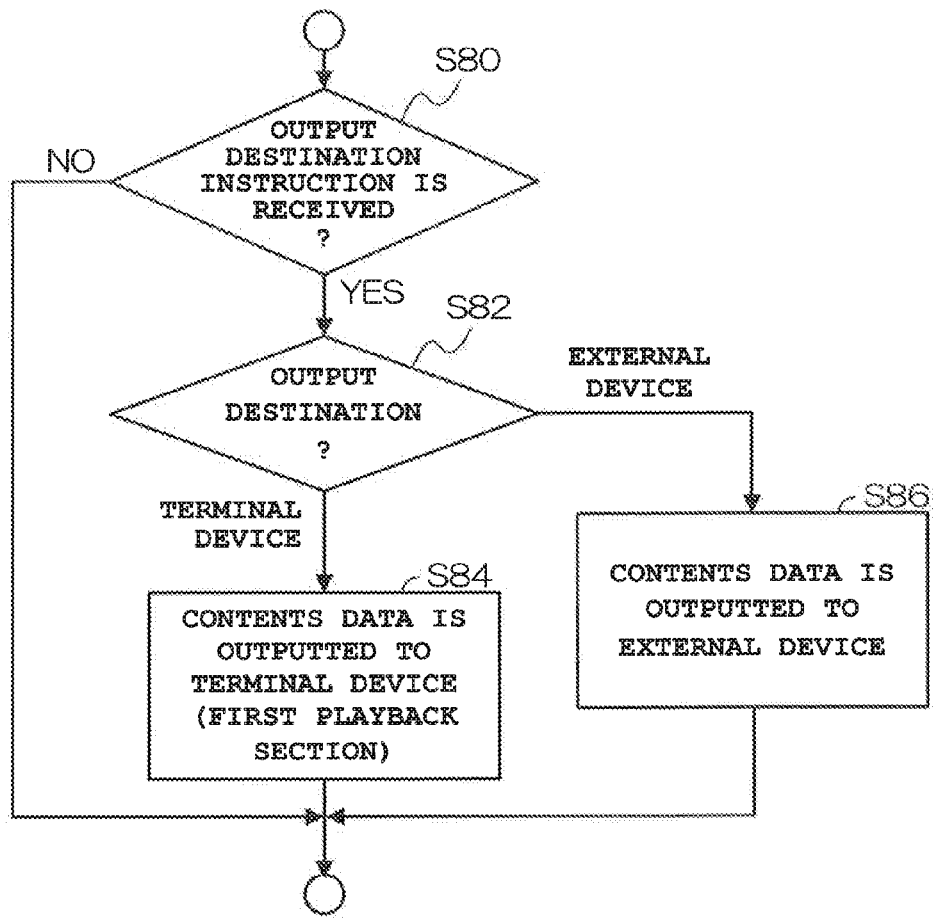
FIG. 8 is a flowchart to describe the operation of the attachment 200 of the second embodiment.

FIG. 7 is a flowchart to describe the operation of the terminal device 100 of the second embodiment. Also, FIG. 8 is a flowchart to describe the operation of the attachment 200 of the second embodiment. When contents data is being replayed (Step S60), the terminal device 100 judges whether or not the removal of the attachment 200 has been detected by the detection section 102 (Step S62). Then, when the removal has been detected (Step S62, YES), the terminal device 100 selects the external device 300 (the second playback section 304 thereof, or the third storage section 303 thereof) as an output destination for the contents data, by the selection section 105 (Step S64), and indicates to the attachment 200 that the output destination is the external device 300 (Step S66).

In contrast, when the removal has not been detected (Step S62, NO), the terminal device 100 (the first playback section 104) is selected by the selection section 105 as an output destination for the contents data (Step S68), and indicated to the attachment 200 as the output destination (Step S70). Note that, when the attachment 200 has not been removed, the output destination is not changed. Therefore, Steps S68 and S70 may be omitted.

In the attachment 200, when the received contents data is being outputted to the terminal device 100 (first playback section 104), it is judged whether or not an output destination instruction has been received by the transmission/reception section 202 from the terminal device 100 (Step S80). When an output destination instruction has not been received (Step S80, NO), the received contents data is continuously outputted to the terminal device 100 (first playback section 104).

In contrast, when an output destination instruction has been received from the terminal device 100 (Step S80, YES), it is judged whether an output destination indicated by the output destination instruction is the terminal device 100 or the external device 300 (Step S82). Then, when the output destination indicated by the output destination instruction is the terminal device 100 ("terminal device" at Step S82), the contents data is outputted to the terminal device 100 (first playback section 104) (Step S84). As a result, in the state where the attachment 200 has been mounted, the content playback by the first playback section 104 of the terminal device 100 is continued In contrast, when the output destination indicated by the output destination instruction is the external device 300 ("external device" at Step S82), the contents data is outputted to the external device 300 (the second playback section 304 thereof, or the third storage section means 303 thereof) (Step S86). As a result, in the state where the attachment 200 has been removed, the contents data is replayed by the second playback section 304 of the external device 300, or stored (recorded) in the third storage section 303 of the external device 300.

Note that, as illustrated in FIG. 6, the third storage section 303 and the second playback section 304 of the external device 300 may be provided in one external device 300 or may be separately provided in external devices 300a and 300b. In this case, a reception section is provided for the respective external devices 300a and 300b.

According to the above-described second embodiment, for example, when contents data is being viewed with the attachment 200 being mounted, this contents data is being replayed on a display section (not illustrated) and the like of the terminal device 100. Here, when the attachment 200 is removed from the terminal device 100, the output destination of the contents data is changed from the display section (not illustrated) and the like of the terminal device 100 to the display section (not illustrated) and the like of the external device 300, whereby the contents data can be viewed in the external device 300. Note that, even when the contents data is music or the like, the same operation can be applied.

According to the above-described second embodiment, contents data can be readily outputted to an external device including a high-performance speaker or a high resolution display, with the mounting or removing of the attachment 200 as a trigger.

C. Third Embodiment

Figure 9:
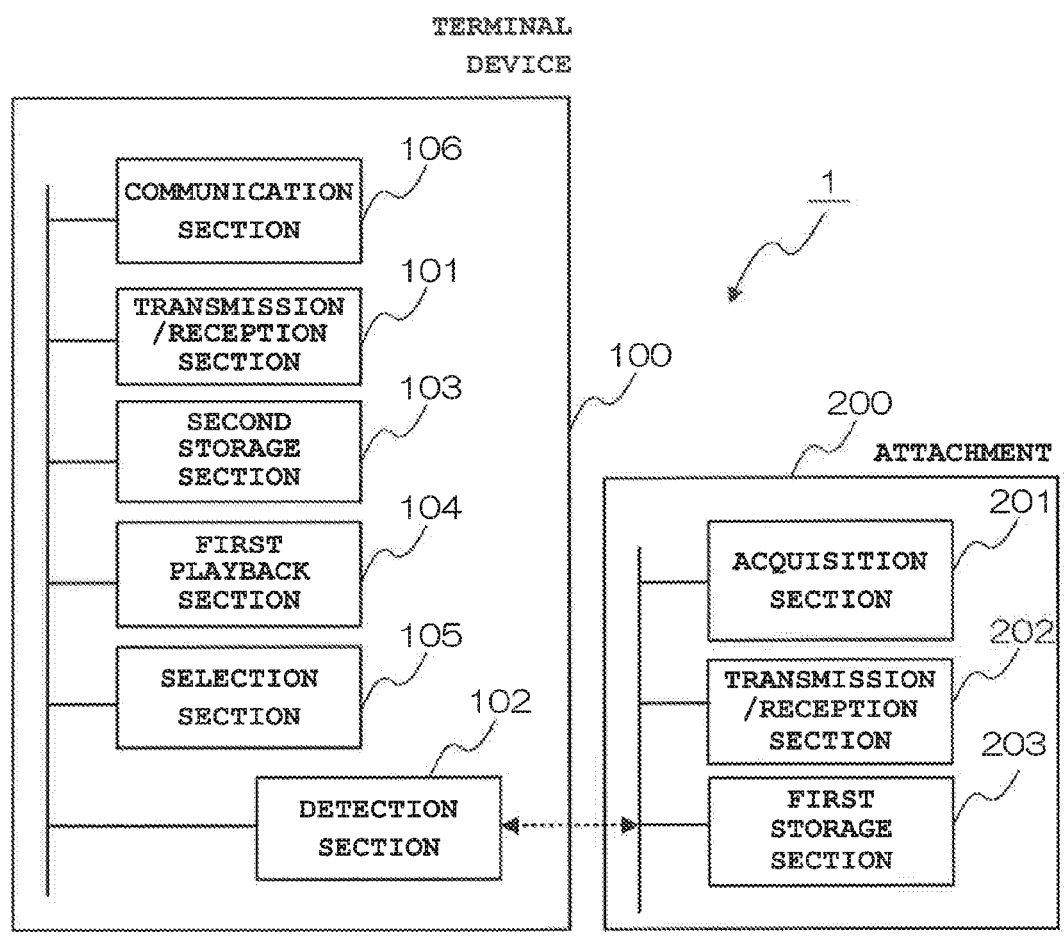
FIG. 9 is a block diagram illustrating the structure of the terminal device 100 and the attachment 200 constituting the contents reception system 1 according to a third embodiment.

Next, the third embodiment of the present invention will be described. FIG. 9 is a block diagram illustrating the structure of the terminal device 100 and the attachment 200 constituting the contents reception system 1 according to the third embodiment. In the diagram, parts corresponding to those of FIG. 2 are given the same reference numerals, and descriptions thereof are omitted. The terminal device 100 further includes a communication section 106 for performing communication with cellular phones and the like.

Figure 10:
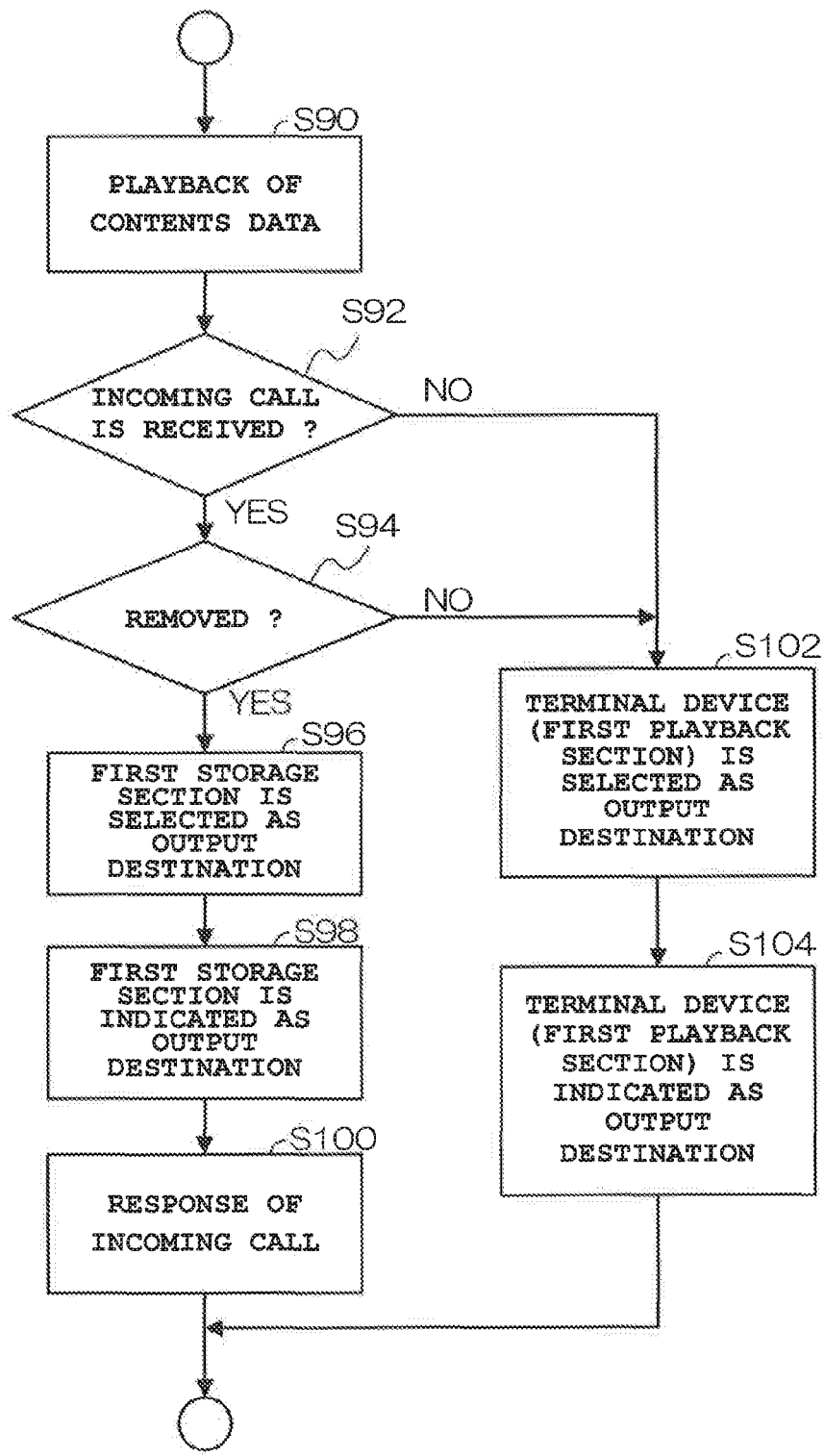
FIG. 10 is a flowchart to describe the operation of the terminal device 100 of the third embodiment.

FIG. 10 is a flowchart to describe the operation of the terminal device 100 of the third embodiment. Note that, the operation of the attachment 200 is similar to that of the above-described flowchart illustrated in FIG. 5. When contents data is received and being replayed (Step S90), the terminal device 100 judges whether or not an incoming call has been received (Step S92). When an incoming call has not been received (Step S92, NO), the terminal device 100 (first playback section 104) is selected as an output destination for the contents data by the selection section 105 (Step S102), and indicated to the attachment 200 as the output destination (Step S104).

Note that, when the attachment 200 has not been removed, the output destination is not changed. Therefore, Steps S102 and S104 may be omitted.

Accordingly, in the attachment 200, the output destination indicated by the output destination instruction is the terminal device 100, and therefore the contents data is outputted to the terminal device 100 (first playback section 104). Consequently, when no incoming call has been received, the content playback by the first playback section 104 of the terminal device 100 is continued.

In contrast, when an incoming call is received while the received contents data is being replayed, (Step S92, YES), it is judged whether or not the removal of the attachment 200 has been detected by the detection section 102 (Step S94). Then, when the removal has not been detected (Step S94, NO), the terminal device 100 (first playback section 104) is selected by the selection section 105 as an output destination for the contents data at Step S102, and indicated to the attachment 200 as the output destination at Step S104, as described above. Note that, when the attachment 200 has not been removed, the output destination is not changed, as described above. Therefore, Steps S102 and S104 may be omitted.

As such, in this case as well, the output destination indicated by the output destination instruction is the terminal device 100, as described above. Therefore, in the attachment 200, the contents data is outputted to the terminal device 100 (first playback section 104). Consequently, when an incoming call is received with the attachment 200 being mounted, the content playback by the first playback section 104 of the terminal device 100 is continued.

In contrast, when an incoming call is received while the received contents data is being replayed (Step S92, YES), and the removal of the attachment 200 is detected (Step S94, YES), the first storage section 203 is selected as an output destination for the contents data by the selection section 105 (Step S96), and indicated to the attachment 200 as the output destination (Step S98). Subsequently, a response to the incoming call is received (Step S100), and the procedure proceeds to communication processing by the communication section 106.

As such, in the attachment 200, the output destination indicated by the output destination instruction is the first storage section 203, and therefore the contents data is outputted to the first storage section 203. Consequently, when an incoming call is received with the attachment 200 being removed, the content is stored (recorded) in the first storage section 203 of the attachment 200.

After the call, when the attachment 200 is mounted on the terminal device 100 again, the contents data is traced back in time (time-shifted) by a period of time interrupted by the call, and replayed. In contrast, after the call, when the attachment 200 is not mounted on the terminal device 100 again, the storage (recording of sound and images) of the contents data into the first storage section 203 of the attachment 200 is performed under a predetermined condition (for example, until the content end, or until the memory is fully stored).

According to the above-described third embodiment, even when an incoming call is received during the playback of contents data, the incoming call can be responded with the removal of the attachment 200 as a trigger, and the contents data can be recorded in the first storage section 203 of the attachment 200 during the call, without operations such as the stoppage of the playback of the contents data and the start of image recording, by which the contents data when the user is responding to the incoming call is prevented from being missed.

D. Fourth Embodiment

Figure 11:
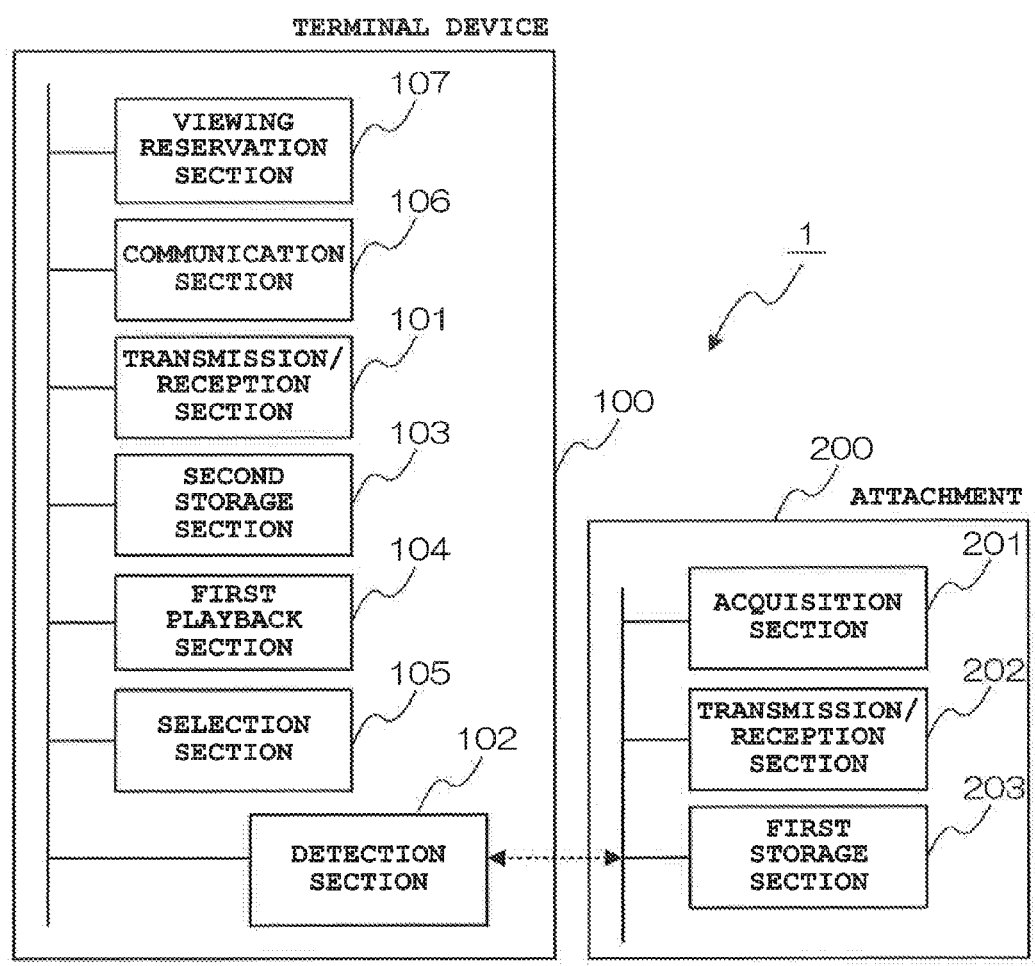
FIG. 11 is a block diagram illustrating the structure of the terminal device 100 and the attachment 200 constituting the contents reception system 1 according to a fourth embodiment.

Next, the fourth embodiment of the present invention will be described. FIG. 11 is a block diagram illustrating the structure of the terminal device 100 and the attachment 200 constituting the contents reception system 1 according to the fourth embodiment. In the diagram, parts corresponding to those of FIG. 2 are given the same reference numerals, and descriptions thereof are omitted. The terminal device 100 further includes a viewing reservation section 107 which receives a viewing reservation for content and notifies the start of the content. The viewing reservation section 107 may activate a viewing application. In the fourth embodiment, when a program desired to be viewed is registered, the start of the content is notified by the viewing reservation section 107, whereby the viewing application is activated.

Figure 12:
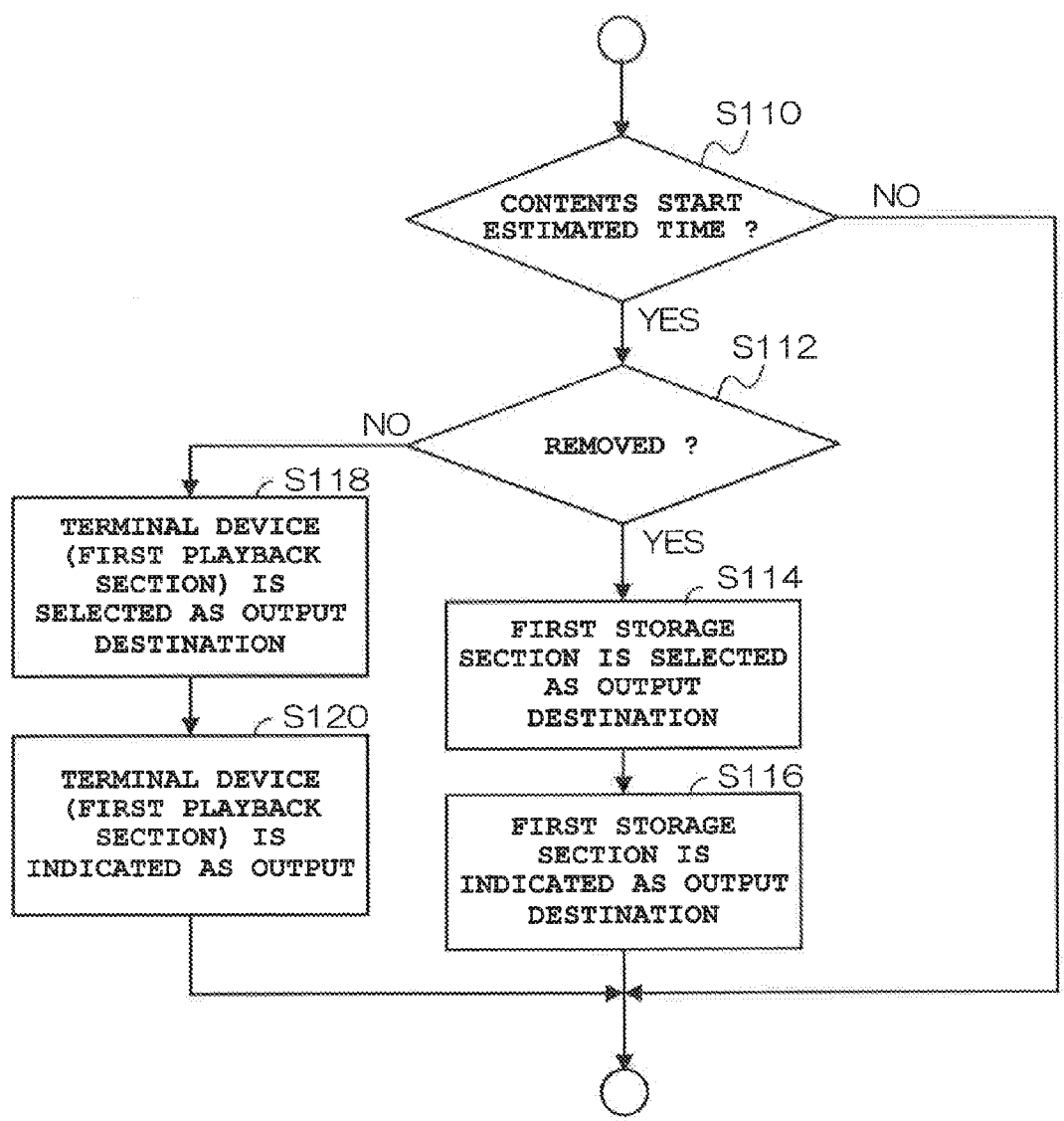
FIG. 12 is a flowchart to describe the operation of the terminal device 100 of the fourth embodiment.

FIG. 12 is a flowchart to describe the operation of the terminal device 100 of the fourth embodiment. Note that the operation of the attachment 200 is similar to the above-described flowchart illustrated in FIG. 5. First, the terminal device 100 receives a viewing reservation (viewing channel, start time of content, and the like) by the viewing reservation section 107. Then, the viewing reservation section 107 judges whether or not a content start estimated time has come (Step S110). When the content start estimated time has not come (Step S110, NO), the processing is completed (returned to the main routine not illustrated). Note that the content start estimated time may be a time where a time required for the notification of the start of content or the activation of a viewing application has been taken into consideration, in addition to the actual content start time. In this case, when a viewing reservation for content is received by the viewing reservation section 107, a time prior to the actual content start time by a predetermined period of time (which can be set to several tens of seconds, several minutes, and the like by a user) is set as the content start estimated time.

In contrast, when the content start estimated time has come (Step S110, YES), it is judged whether or not the removal of the attachment 200 has been detected by the detection section 102 (Step S112). Then, when the attachment 200 has been removed (Step S112, YES), the first storage section 203 is selected as an output destination for the contents data by the selection section 105 (Step S114), and indicated to the attachment 200 as the output destination (Step S116).

In the attachment 200, since the output destination indicated by the output destination instruction is the first storage section 203, the contents data is outputted to the first storage section 203. As a result, when a viewing reservation has been made but the attachment 200 has been removed, the contents data is stored (recorded) in the first storage section 203 of the attachment 200.

Here, a notification section (not illustrated), such as a speaker provided in the terminal device 100, may notify that the attachment 200 has been removed. Also, switching to playback by the terminal device 100 can be performed with the re-mounting of the attachment 200 as a trigger.

In contrast, when the removal has not been detected (Step S112, NO), the terminal device 100 (first playback section 104) is selected as an output destination for the contents data by the selection section 105 (Step S118), and indicated to the attachment 200 as the output destination (Step S120). Note that, when the attachment 200 has not been removed, the output destination is not changed (terminal device 100). Therefore, Steps S118 and S120 may be omitted.

As such, when the attachment 200 has been mounted at the content start time, the contents data is replayed on the display section (not illustrated) and the like of the terminal device 100.

Note that, even when the contents data is music or the like, the same operation can be applied.

According to the above-described fourth embodiment, even in a case where the attachment 200 has not been mounted when content for which a viewing reservation has been made is started, the storage (recording) is performed by the first storage section 203 of the attachment 200, which prevents the contents data from being missed.

In the above-described first to fourth embodiments, the mounting or removing of the attachment 200 is detected by the detection section 102 of the terminal device 100, an output destination for contents data is selected by the selection section 105 of the terminal device 100 based on the detection result, and the output destination is indicated to the attachment 200 by the terminal device 100. However, the present invention is not limited thereto, and may be configured such that the mounting or removing on/from the terminal device 100 is detected by a detection section (not illustrated) on the attachment 200 side, and an output destination for the contents data is changed on the attachment 200 side based on the detection result.

Also, in the above-described third embodiment, when an incoming call is received with received contents data being replayed, a response to the incoming call is made and the contents data is stored in the first storage section 203 of the attachment 200 by the attachment 200 being removed. However, the present invention is not limited thereto, and may be configured such that, when an incoming call is received with received contents data being replayed, only a response to the incoming call is made by the attachment 400 being removed.

Also, when the terminal device 100 is replaying received streaming data from the attachment 200 in the above-described first to third embodiments, this streaming data may be stored (downloaded) in the first storage section 203 of the attachment 200. That is, the attachment 200 outputs the received streaming data to the first storage section 203 thereof and to the terminal device 100. Also, the terminal device 100 may store the streaming data in the second storage section 103 thereof while receiving and replaying the streaming data from the attachment 200.

In the embodiments, the present invention has been applied to a cellular phone as a terminal device. However, the present invention is not limited thereto. The present invention may be widely applied to portable or stationary terminal equipment capable of wireless communication, such as digital cameras having a communication function, portable information terminals, personal computers, communication equipment, other electronic devices and the like.

Hereinafter, the characteristics of the present invention will be additionally described.

The above-described embodiments can be partially or entirely described as the Supplementary Notes described below, but are not limited thereto.

(Supplementary Note 1)

Figure 13:
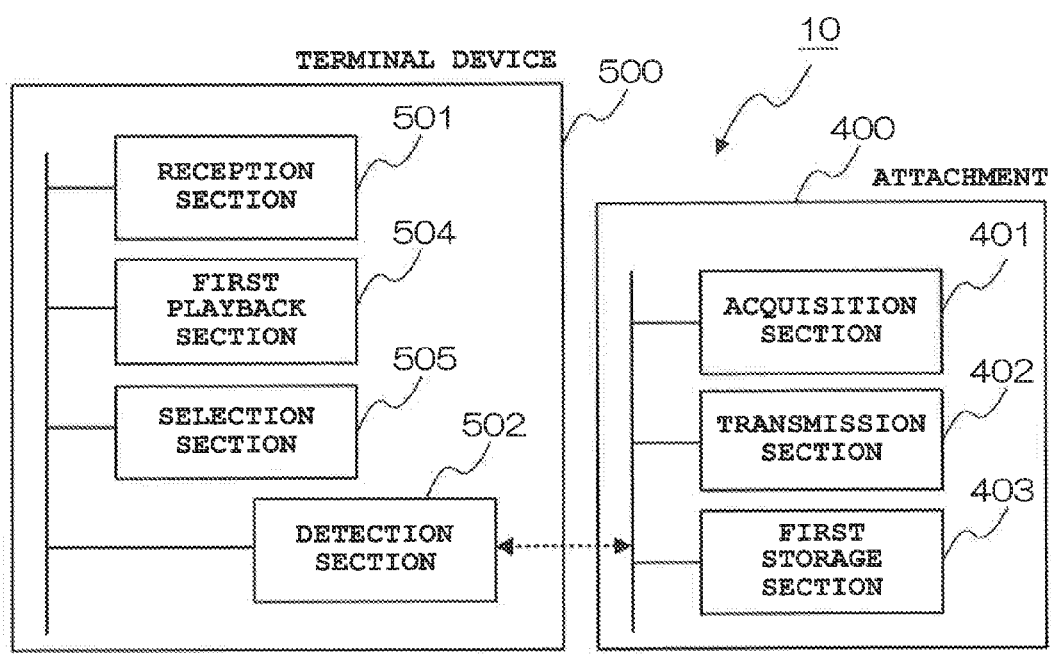
FIG. 13 is a configuration diagram of Supplementary Note 1.

FIG. 13 is a configuration diagram of Supplementary Note 1. As described in the diagram, the invention described in the Supplementary Note 1 is a contents reception system 10 comprising a terminal device 500 and an attachment 400 that is detachably mounted on the terminal device 500, characterized in that the attachment 400 comprises an acquisition section 401 for acquiring contents data, a transmission section 402 for transmitting the contents data acquired by the acquisition section to the terminal device, and a first storage section 403 for storing the contents data; the terminal device 500 comprises a reception section 501 for receiving the contents data transmitted by the transmission section 402, a detection section 502 for detecting mounting or removing of the attachment 400, a first playback section 504 for replaying the contents data, and a selection section 505 for selecting at least one of the first storage section 403 and the first playback section 504 as an output destination for the contents data received by the reception section 501 based on a result of detection of the mounting or the removing of the attachment 400 by the detection section 502; and the attachment 400 outputs the contents data acquired by the acquisition section 401 to at least one of the first storage section 403 and the first playback section 504 based on a result of selection by the selection section 505 of the terminal device 500.

(Supplementary Note 2)

The contents reception system according to the Supplementary Note 1 characterized in that the terminal device further comprises a second storage section for storing the contents data, in which the selection section selects at least one of the first storage section, the second storage section, and the first playback section as the output destination for the contents data received by the reception section based on the result of the detection of the mounting or the removing of the attachment by the detection section; the attachment outputs the contents data acquired by the acquisition section to at least one of the first storage section, the second storage section, and the first playback section based on the result of the selection by the selection section of the terminal device.

(Supplementary Note 3)

The contents reception system according to the Supplementary Note 1 characterized in that the selection section selects the first storage section as an output destination for the contents data when the removing of the attachment is detected by the detection section, and the attachment outputs the contents data acquired by the acquisition section to the first storage section that is the output destination selected by the selection section of the terminal device.

(Supplementary Note 4)

The contents reception system according to the Supplementary Notes 1 characterized by further comprises an external apparatus which is connected to the terminal device and/or the attachment by cable or wireless and including a second playback section and/or a third storage section, in which the selection section further selects at least one of the second playback section and the third storage section as the output destination for the contents data based on the result of the detection of the mounting or the removing of the attachment by the detection section, and the attachment further outputs the contents data acquired by the acquisition section to at least one of the second playback section and the third storage section selected as the output destination for the contents data based on the result of the selection by the selection section of the terminal device.

(Supplementary Note 5)

The contents reception system according to Supplementary Note 1 characterized in that the terminal device further comprises a communication section having an incoming call response function, in which the detection section detects the mounting or the removing of the attachment when an incoming call is received during playback of the contents data by the first playback section, and the communication section starts responding to the incoming call when the removing of the attachment is detected by the detection section.

(Supplementary Note 6)

The contents reception system according to the Supplementary Note 5 characterized in that, when the mounting of the attachment is detected by the detection section after a telephone call corresponding to the incoming call responded by the communication section is finished, the first playback section retroactively replays the contents data stored in the first storage section by tracing back a period of time during which the playback is interrupted by the telephone call.

(Supplementary Note 7)

The contents reception system according to Supplementary Note 3 characterized in that the terminal device further comprises a viewing reservation section for receiving a viewing reservation for the contents data, in which the detection section detects the mounting or the removing of the attachment when a viewing start scheduled time of the contents data received by the viewing reservation section starts; the selection section selects at least one of the first playback section and the first storage section as the output destination for the contents data based on the result of the detection of the mounting or the removing of the attachment by the detection section; and the attachment outputs the contents data acquired by the acquisition section to at least one of the first playback section and the first storage section based the result of the selection by the selection section of the terminal device.

(Supplementary Note 8)

An attachment that is detachably mounted on a terminal device, comprising an acquisition section for acquiring contents data, a storage section for storing the contents data, and an output section for outputting the contents data acquired by the acquisition section to at least one of the storage section and the terminal device based on an output destination instruction for the contents data which is selected based on a result of detection of mounting or removing of the attachment to and from the terminal device.

(Supplementary Note 9)

A terminal device on which an attachment is detachably mounted, comprising a reception section for receiving contents data transmitted from the attachment, a detection section for detecting mounting or removing of the attachment, a playback section for replaying the contents data received by the reception section, and a selection section for selecting at least one of the attachment and the playback section as an output destination for the contents data based on a result of detection of the mounting or the removing of the attachment by the detection section, and indicating the output destination selected for the contents data to the attachment.

(Supplementary Note 10)

A contents reception system comprising a terminal device and an attachment that is detachably mounted on the terminal device, characterized in that the attachment comprises an acquisition section for acquiring contents data and a transmission section for transmitting the contents data acquired by the acquisition section to the terminal device, and the terminal device comprises a communication section having an incoming call response function, a reception section for receiving the contents data transmitted by the transmission section, a first playback section for replaying the contents data received by the reception section, and a detection section for detecting mounting or removing of the attachment when an incoming call is received during playback of the contents data by the first playback section, in which the communication section starts responding to the incoming call when the removing of the attachment is detected by the detection section.

DESCRIPTION OF REFERENCE NUMERALS 1 contents reception system
100 terminal device
101 transmission/reception section
102 detection section
103 second storage section
104 first playback section
105 selection section
106 communication section
107 viewing reservation section
200 attachment
201 acquisition section
202 transmission/reception section
203 first storage section
300, 300a, 300b external device
303 third storage section
304 second playback section
305 reception section

The invention claimed is:

1. A contents reception system comprising:
a terminal device; and
an attachment that is detachably mounted on the terminal device,
wherein the attachment comprises:
a first memory; and
a first processor communicatively coupled to the first memory and the terminal device, wherein the processor is configured to:
acquire contents data;
transmit the acquired contents data to the terminal device;
stored the acquired contents data in the first memory; and
wherein the terminal device comprises:
a second memory;
a first playback interface that receives data for playback; and
a second processor communicatively coupled to the second memory, the first playback interface, and the attachment, wherein the processor is configured to:
receive the contents data transmitted by the attachment;
detect a mounting or a removing of the attachment;
select at least one of the first memory and the first playback interface as an output destination for the received contents data based on a result of detection of the mounting or the removing of the attachment, and
wherein the first processor of the attachment is further configured to output the acquired contents data to the at least one of the first memory and the first playback interface based on a result of selection by the terminal device,
wherein the first memory is selected as the output destination for the acquired contents data when the removing of the attachment is detected during a reception of the contents data by the terminal device, and
wherein the first processor of the attachment, configured to output the acquired contents data, is further configured to output the acquired contents data to the first memory when the first memory is selected as the output destination by the terminal device.

2. The contents reception system according to claim 1, wherein the second processor is communicatively coupled to the second memory, and wherein the second processor is further configured to select the second memory based on the result of the detection of the mounting or the removing of the attachment by the detection section, and wherein the first processor of the attachment is further configured to output the acquired contents data to the second storage section.

3. The contents reception system according to claim 1, further comprises an external apparatus which is communicatively coupled to at least one of the terminal device and the attachment, wherein the external apparatus comprises at least one of a second playback interface and a third memory, wherein the second processor of the terminal is further configured to select at least one of the second playback interface and the third memory as the output destination for the contents data based on the result of the detection of the mounting or the removing of the attachment, and wherein the first processor of the attachment is further configured to output the acquired contents data to at least one of the second playback interface and the third memory selected by the terminal device.

4. The contents reception system according to claim 1, wherein the second processor of the terminal device is further configured to receive a viewing reservation for the contents data; and detect the mounting or the removing of the attachment when a viewing start scheduled time of the contents data starts.

5. The contents reception system according to claim 1, wherein the second processor of the terminal device is further configured to:

respond to an incoming call; and detect the mounting or the removing of the attachment when the incoming call is received during a playback of the contents data by the first playback interface, wherein the responding to the incoming call starts when the removing of the attachment is detected.

6. The contents reception system according to claim 5, wherein, when the mounting of the attachment is detected after the incoming call is finished, the second processor of the terminal device is further configured to replay the contents data stored in the first memory by tracing back a period of time during which the playback is interrupted by the incoming call.

* * * * *